United States Patent [19]

Ezra

[11] Patent Number: 5,647,339

[45] Date of Patent: Jul. 15, 1997

[54] GRILLING DEVICE

[76] Inventor: Shalom Ezra, Beit Shamai 39, Ramat Hasharon, Israel

[21] Appl. No.: 535,467

[22] Filed: Sep. 28, 1995

Related U.S. Application Data

[63] Continuation-in-part of Ser. No. 239,530, May 9, 1994, abandoned.

[30] Foreign Application Priority Data

Jul. 28, 1993 [IL] Israel .......................................... 106515

[51] Int. Cl.$^6$ .................................................. A47J 37/00
[52] U.S. Cl. .................. 126/41 R; 126/9 R; 126/299 R; 99/447
[58] Field of Search ............................. 126/41 R, 9 R, 126/39 C, 153, 9 B, 39 D, 299 R, 299 D; 99/450, 49, 445, 447, 444

[56] References Cited

U.S. PATENT DOCUMENTS

| Re. 32,288 | 11/1986 | Berger | 99/450 |
|---|---|---|---|
| 4,403,541 | 9/1983 | Berger | 99/450 |
| 4,787,364 | 11/1988 | Zepeda | 126/41 R |
| 4,878,477 | 11/1989 | McLane | 126/41 R |
| 4,886,044 | 12/1989 | Best | 126/39 C |
| 5,076,154 | 12/1991 | Bagwell | 99/446 |
| 5,347,978 | 9/1994 | Zuran | 126/41 R |
| 5,363,752 | 11/1994 | Weil | 99/446 |

FOREIGN PATENT DOCUMENTS

| 2645867 | 6/1977 | Germany . |
|---|---|---|
| 2926147 | 1/1981 | Germany . |

*Primary Examiner*—James C. Yeung
*Attorney, Agent, or Firm*—Birch, Stewart, Kolasch & Birch, LLP

[57] ABSTRACT

The present invention relates to a device including a bottom frame connected to a gas source in which the connection includes a device for distributing gas emanating from the gas source to openings, the openings being distanced from each other. A middle frame is mounted on the bottom frame and provided with gas jets through which the gas emanating from the openings may flow and be ignited, the jets being located within a plate mounted upon the openings. An upper frame is mounted on the middle frame and includes slatted grills distanced from each other at a distance corresponding to the distance between the gas jets. All frames are located one upon another in one subframe or in separate frames.

6 Claims, 10 Drawing Sheets

1
GRILLING DEVICE

This application is a continuation-in-part of application Ser. No. 08/239,530 filed on May 9, 1994, abandoned, the entire contents of which are hereby incorporated by reference.

BACKGROUND OF THE INVENTION

1. Field of the Invention

The present invention relates to a grilling device to be used inside the house, in particular one which can be mounted on a standard gas cooking range.

2. Description of Related Art

Many people want to grill foodstuffs, in particular steaks, at home. There are certain commercially available devices which can be used for this purpose, however, these devices have many drawbacks. In particular, they are either complicated to use, or fat and/or any liquid emanating from food makes the device so dirty that it is very difficult to clean. Moreover, the fat or liquid may cause the flames and/or the gas to be extinguished while the gas remains open, which is very dangerous.

It has therefore been desirable to design a grilling device which would overcome the above drawbacks, i.e., would be simple to clean and would be safe to use.

SUMMARY OF THE INVENTION

The present invention thus consists in a grilling device comprising the following parts:

a) a bottom frame being provided with means to be connected to a gas source in which are located means for distributing gas emanating from said source to openings, said openings being distanced from each other;

b) a middle frame mounted on said bottom frame being provided with gas jets through which the gas emanating from said openings may flow and be ignited, said jets being located within a plate upon said openings; and c) an upper frame being mounted on said middle frame, the upper frame included slatted grills spaced apart from each other at a distance corresponding to the distance between the gas jets;

all said frames being located one upon another in a superposed relationship. All of the distinct frames may be housed within a single frame. Alternatively, each frame may be a separate frame, all frames having the same peripheral size and being mounted one on top of each other.

The device according to the present invention is suitably mounted on a standard gas cooking range. Advantageously, the peripheral size of the device is one-half of the peripheral size of the cooking range. In this case, the means to be connected to the gas source are connected to one of the cooking heads, preferably the large one. The flow of the gas is controlled by a knob controlling the gas flow towards the cooking head.

However, the grilling device according to the present invention may also constitute a separate unit and in this case said means are connected to an independent gas source, e.g. a tank to be provided with a regulating knob.

The device may be ignited electrically or by a match.

Advantageously, there is provided a cover, having the same peripheral size as the basic device, to be mounted on the upper frame of the grilling device, the cover part being provided with a funnel or exhaust tube, in which is located a filter for filtering out smoke generated by grilling food stuffs. Advantageously, the funnel or exhaust tube is also provided with a fan. The filter is preferably the same as that utilized on a conventional gas mask.

When the device is to be used, the food is put on the slatted grills and the fat and/or liquid drips down to the middle frame and is collected in the space between the gas jets. When cleaning the device, the fat can be easily removed from the middle frame.

The device according to the present invention is suitably made of an easily cleaned metallic material, such as stainless steel, etc.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will now be illustrated with reference to the accompanying drawings. Similar parts appearing in several figures will be marked by the same numerals. Identical parts in the same drawing will be referenced only once. In said drawings.

DETAILED DESCRIPTION OF PREFERRED EMBODIMENTS

Figure 1:
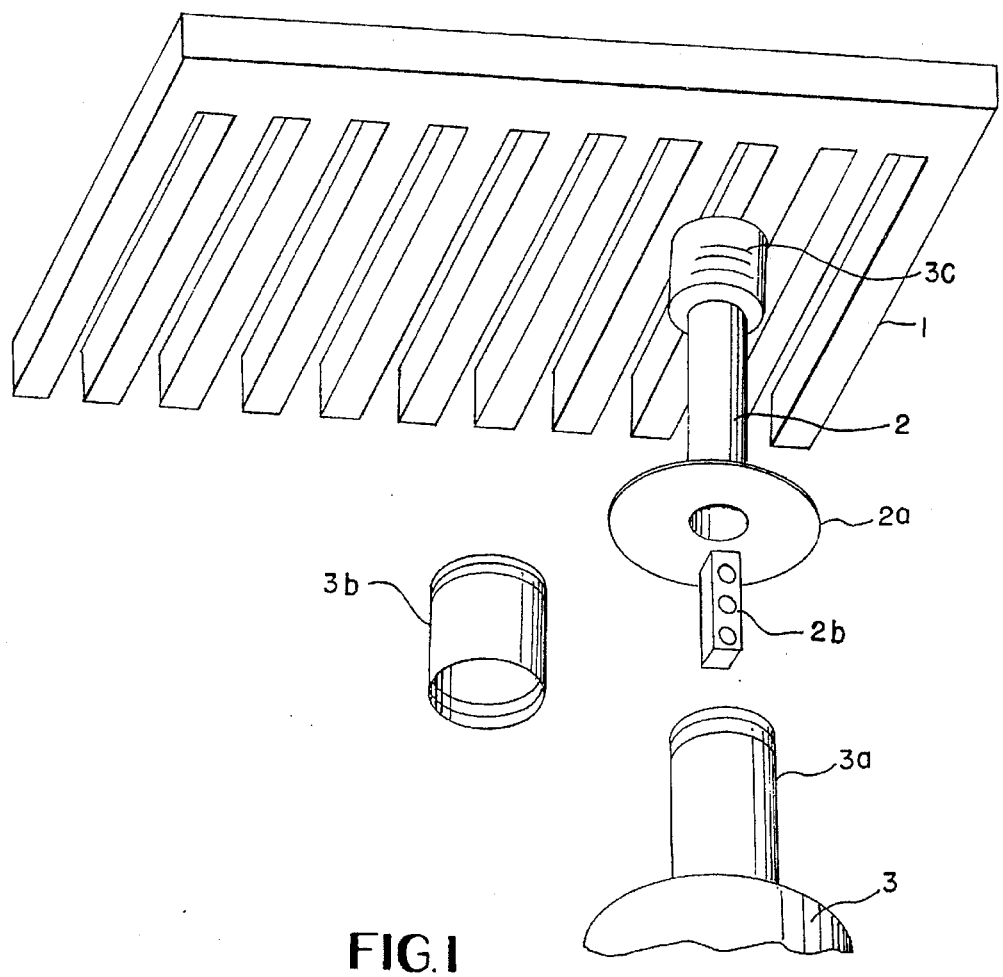
FIG. 1 shows an exploded view from the bottom of a bottom frame of the grilling device according to the present invention.
Figure 2A:
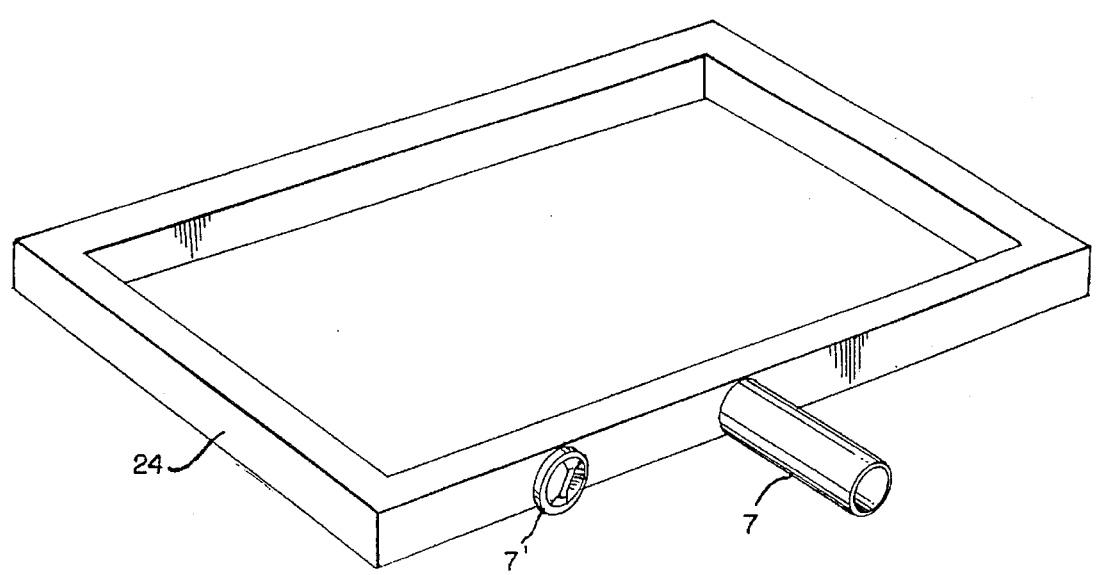
FIG. 2A shows a perspective view of a subframe with an optional regulating knob.
Figure 2B:
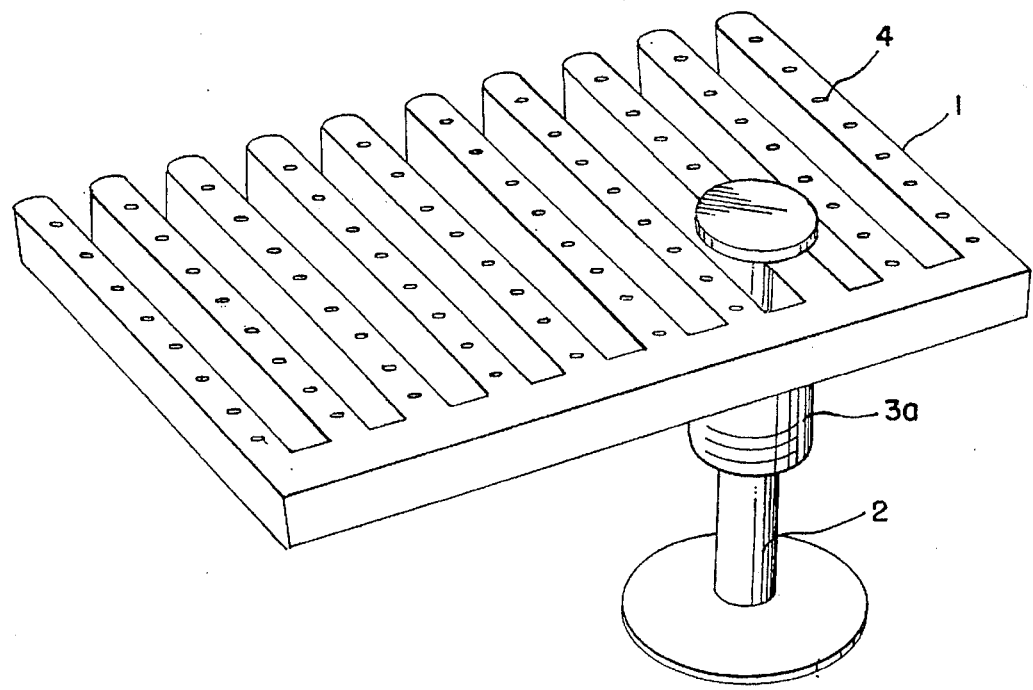
FIG. 2B shows a perspective view of the bottom frame.
Figure 9:
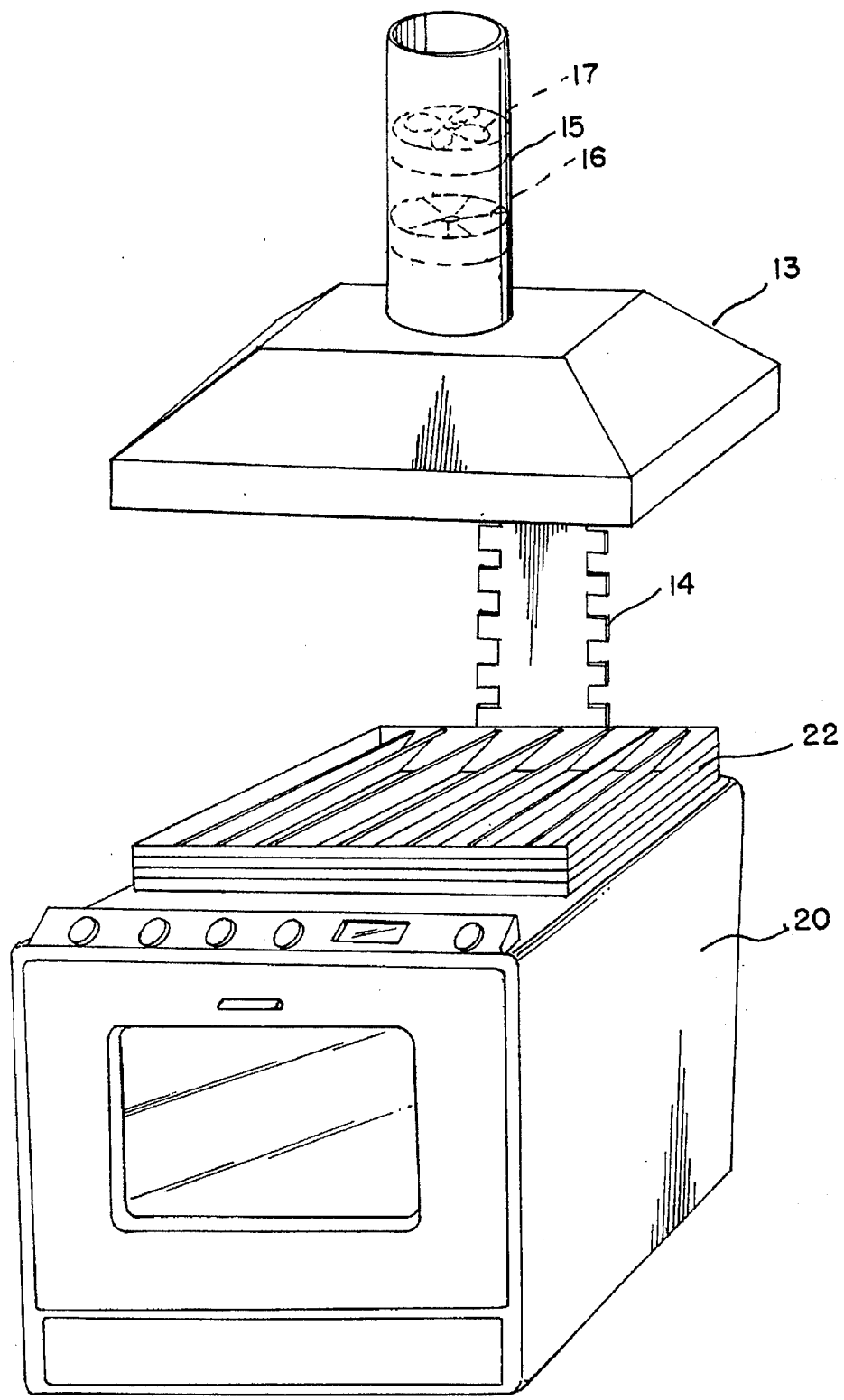
FIG. 9 shows a perspective view of the device mounted on a conventional gas range.

The lower portion of the grilling device, shown in FIGS. 1, 2A and 2B comprises a first main frame 1 and a subframe 24 being jointly provided with a connecting shaft pipe 2. A source 3 from which the gas emanates toward openings 4 may be a tank, or alternatively a surface of a standard gas cooking range as shown in FIG. 9. The first frame 1 is optionally provided with means 7 to be connected to the gas source 3 and a regulating knob 7'. Element 3c attaches the connecting shaft pipe 2 to the frame 1, the element 3c including outer threads thereon for additional connection to a connecting portion 3a of the gas source 3. Element 3a additionally disperses the gas supply from the source 3 into the pipe 2. Each of pipes 3c and 3a are connectable by a threaded cylinder 3b shown in FIG. 1. The result of the plural connections is that plural fuel supplies may be utilized with a single device.

For example, a first possibility is that gas is supplied by a conventional cooking range. In this instance, element 2a is placed on the cooking range and part 2b is the ignition device.

Additionally, a second possibility is that the gas is supplied by a tank, as represented by element 3 in combination with 3a, 3b and 3c.

Finally, a third possibility is that the gas is supplied from a remote source, thus necessitating the use of supply pipe 7 controlled by knob 7'.

Figure 3:
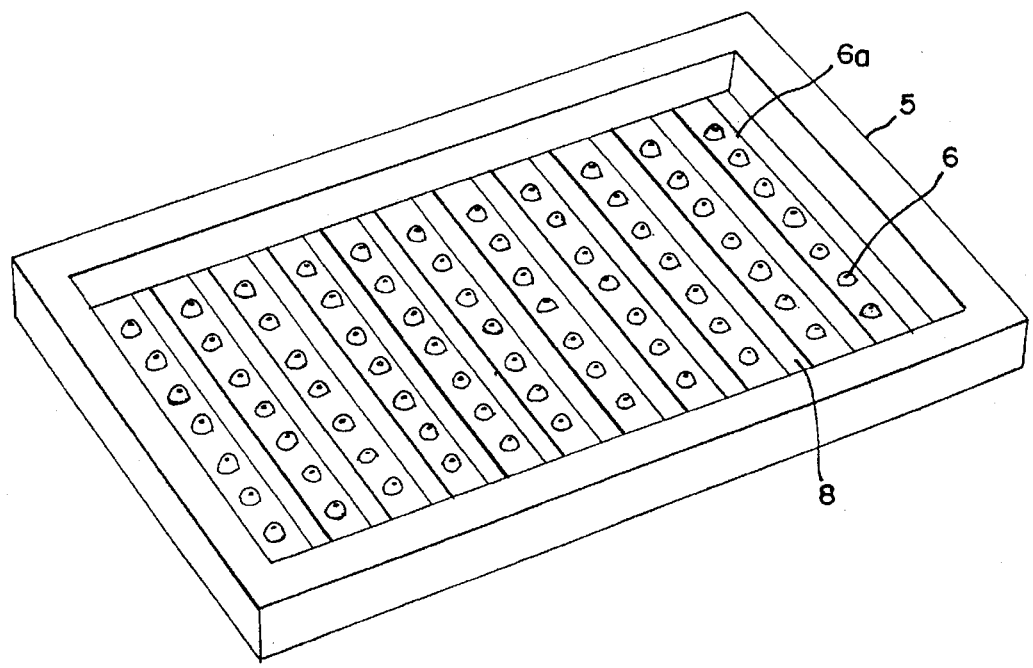
FIG. 3 shows a perspective view of a middle frame provided with gas jets.

FIG. 3 shows a frame 5, constituting the middle frame which includes a plurality of gas jets 6 within a plate 6a, the gas jets corresponding to openings 4 in FIG. 2b, respectively. The jets 6 are distanced from each other as shown by spacing 8.

Figure 4:
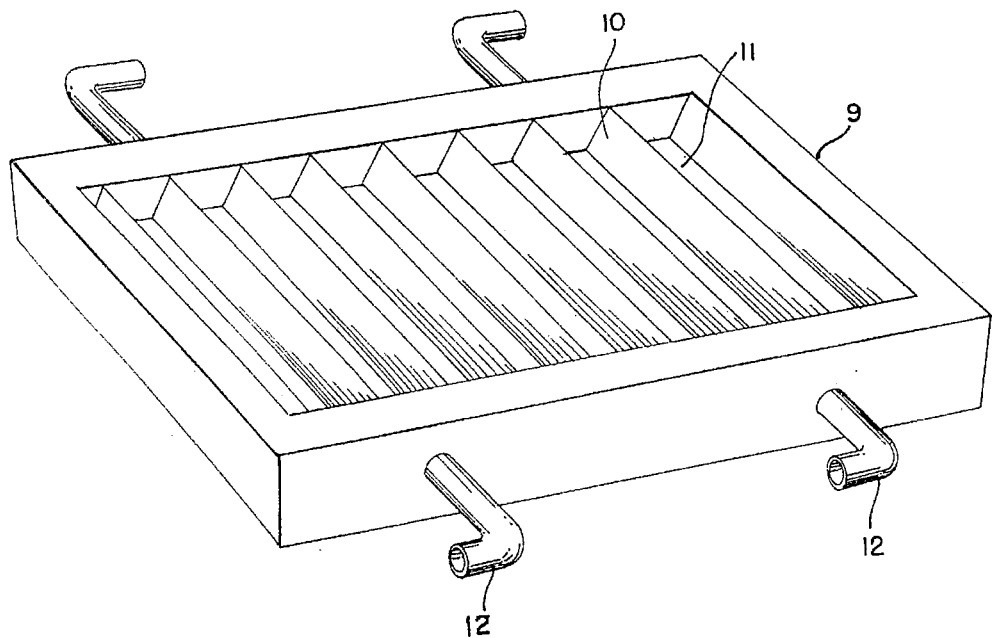
FIG. 4 shows a perspective view of an upper frame of the device.

FIG. 4 shows a frame 9 constituting the upper frame. Within the frame 9 are located slatted grills 10 distanced from each other by a distance 11. Distance 11 corresponds to distance 8 of the middle frame 5. Thus, the fat and/or liquid dripping down from the slatted grills 10 is caught in the area determined by distance 8 without dripping on and extinguishing the gas jets 6 and can thus be cleaned easily. Frame 9 is provided with connecting pipes 12 at front and rear sides thereof.

Figure 5:
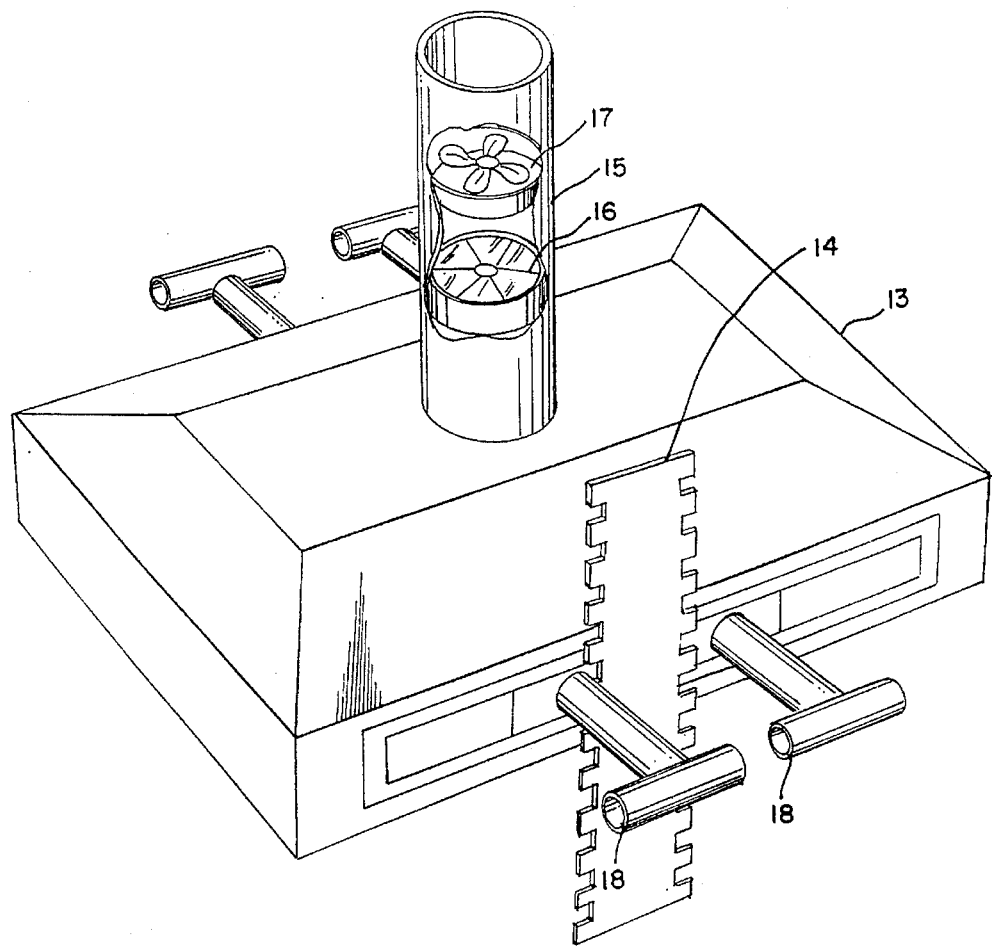
FIG. 5 shows a perspective view of a cover.
Figure 6:
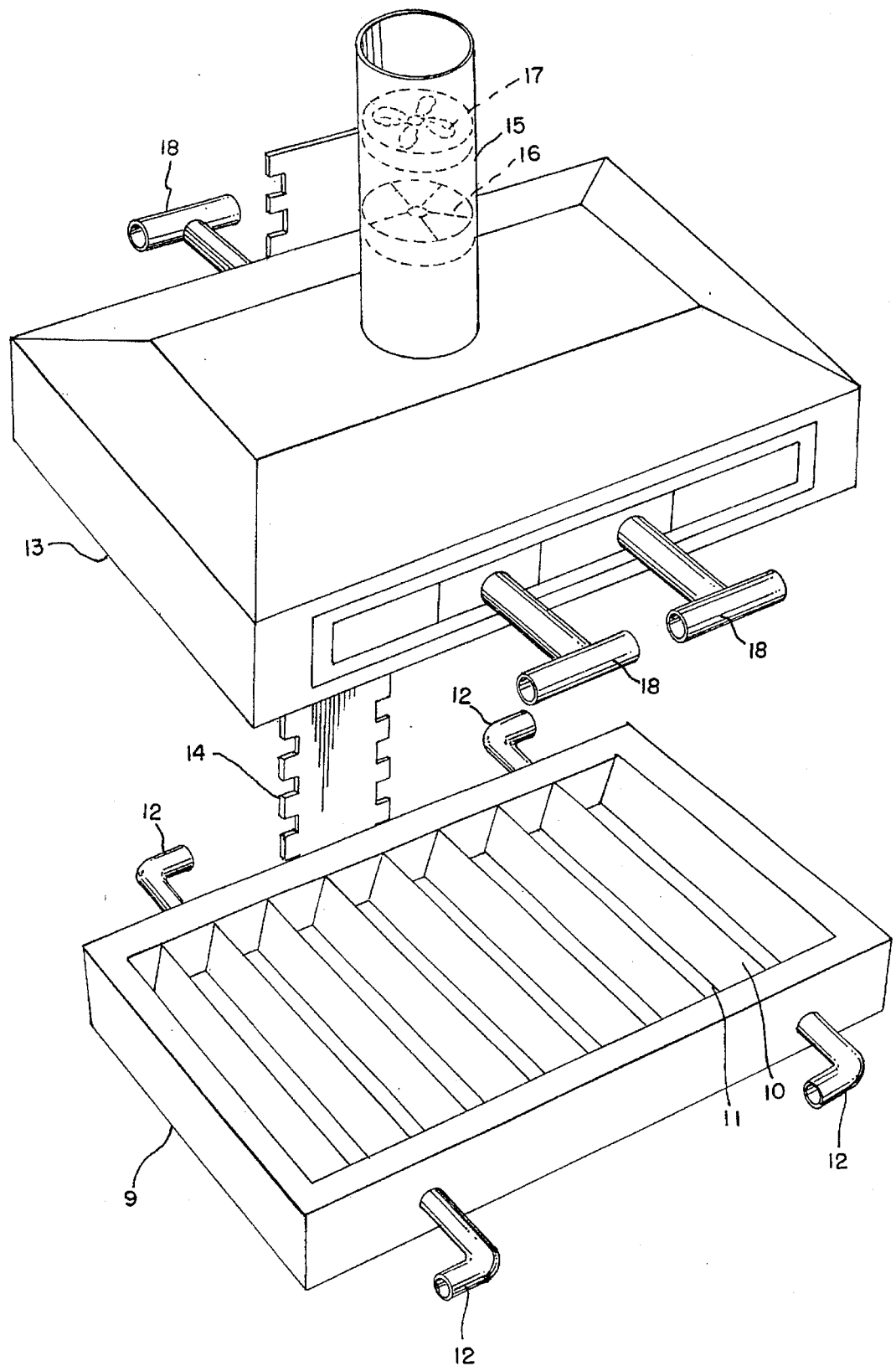
FIG. 6 shows the cover of FIG. 5 being connected to the upper frame shown in FIG. 4.

FIG. 5 shows a cover 13 being provided with a vertical support member 14. The cover 13 is also provided with a chimney 15 in which there is located a filter 16 and a fan 17. The cover 13 is connected by pipes 18 to pipes 12 of frame 9 with the ends of pipes 12 being inserted into the openings of pipes 18 (the resulting connection not being specifically shown in the drawings). (See FIG. 6).

Figure 7:
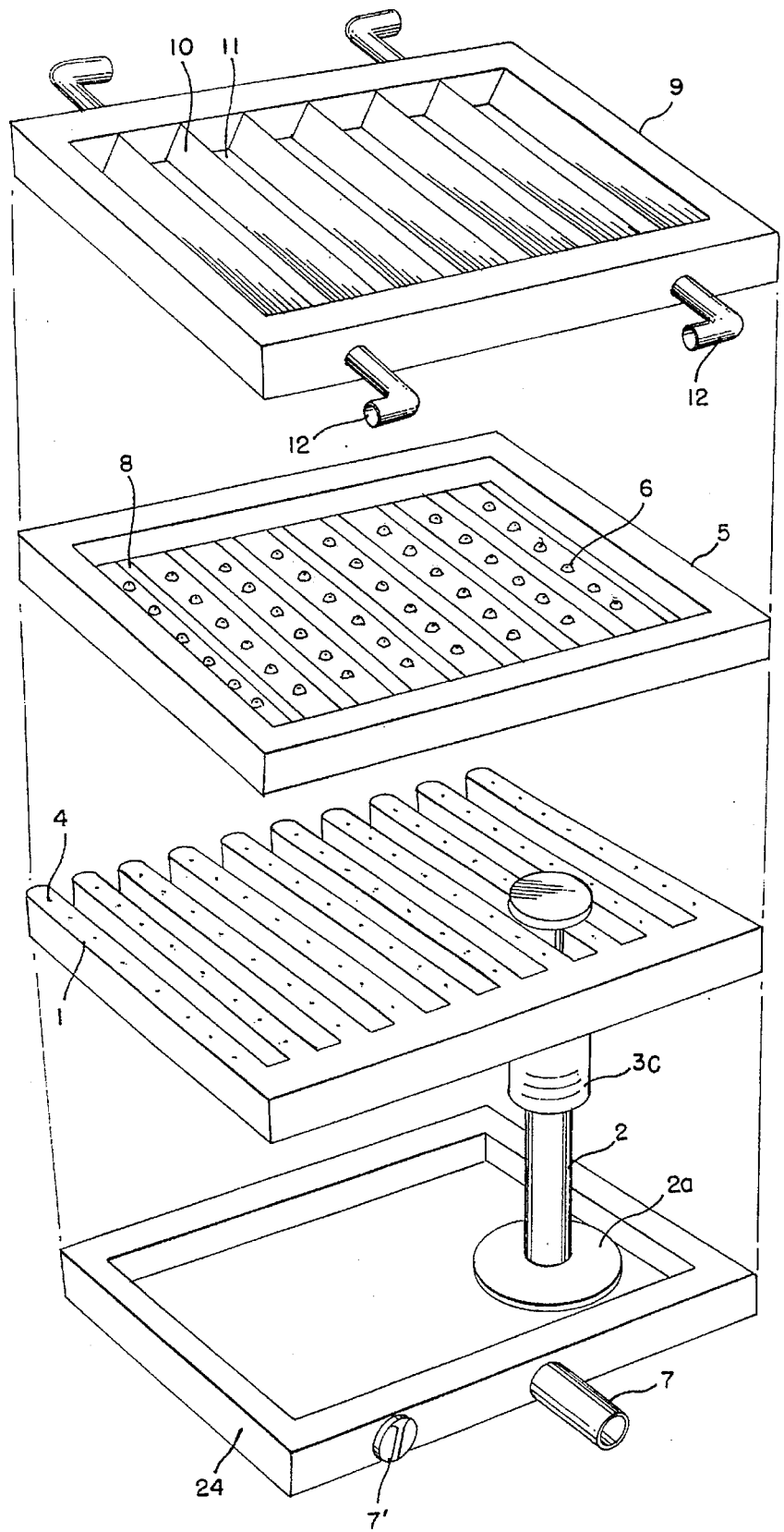
FIG. 7 shows an exploded view of the device including all assembled frames.
Figure 8:
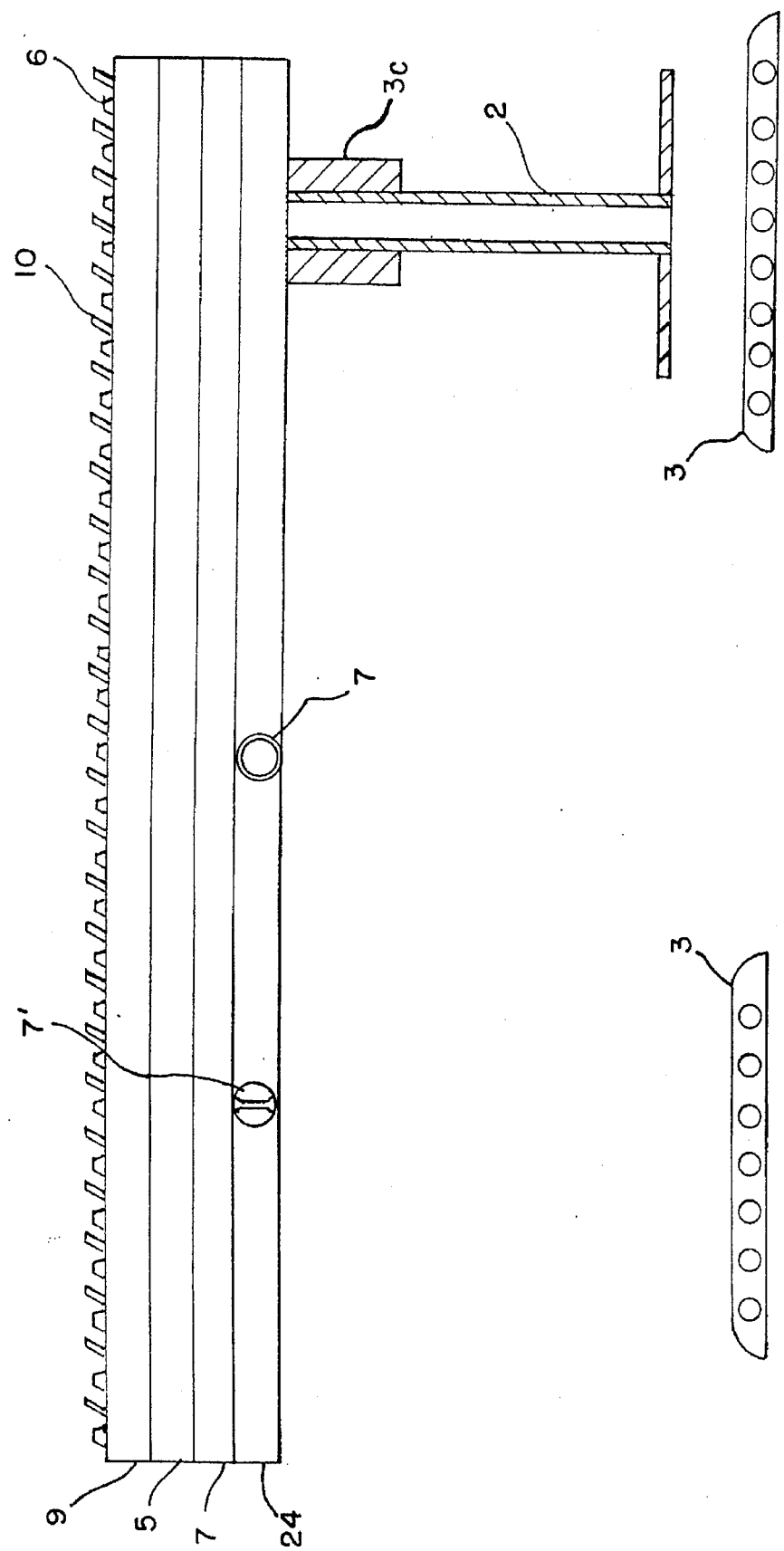
FIG. 8 shows a side sectional view of the device with all frames assembled.

Frames 1, 5, 9 (if present) and 13 have the same sizes and can therefore be easily mounted on each other as shown in FIGS. 7 and 8.

As indicated above, all parts may be located within one frame only. Then frames 1, 5 and 9 will form a frame on which, if necessary, supply means 7 and knob 7' will be mounted.

Figure 10:
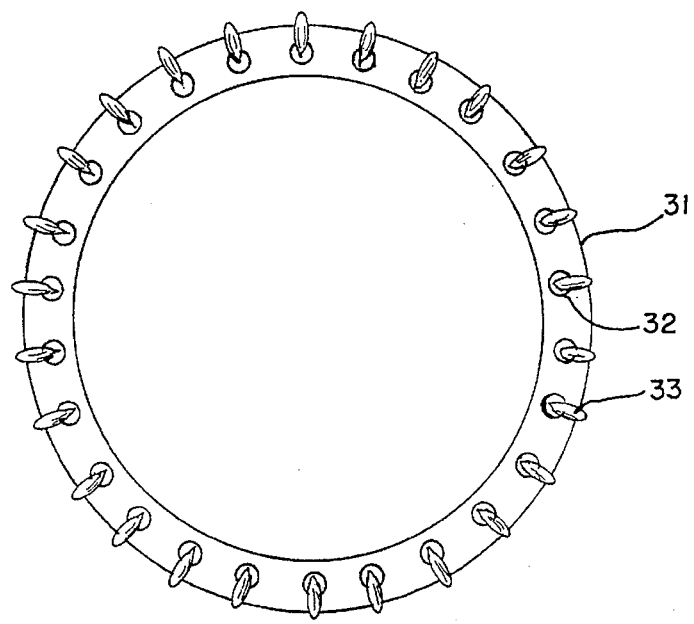
FIG. 10 shows a top view of an alternative embodiment of a cooking range according to the present invention.

FIG. 10 shows a top view of a cooking range for use with the present invention, which is not specifically part of the device according to the present invention. The cooking range includes a ring 31 and openings 32 through which a gas/fire flow 33 emanates (The knob regulating the flow of the gas is shown on the range 2a in FIG. 9).

Figure 11:
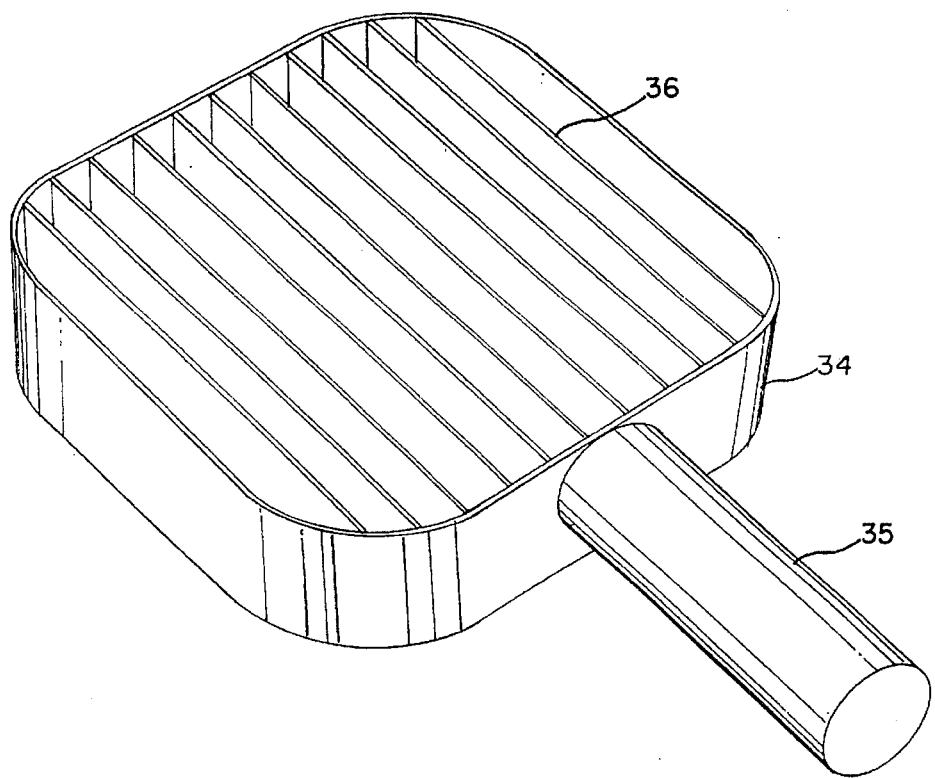
FIG. 11 shows a perspective view of the alternative embodiment according to the present invention.
Figure 12:
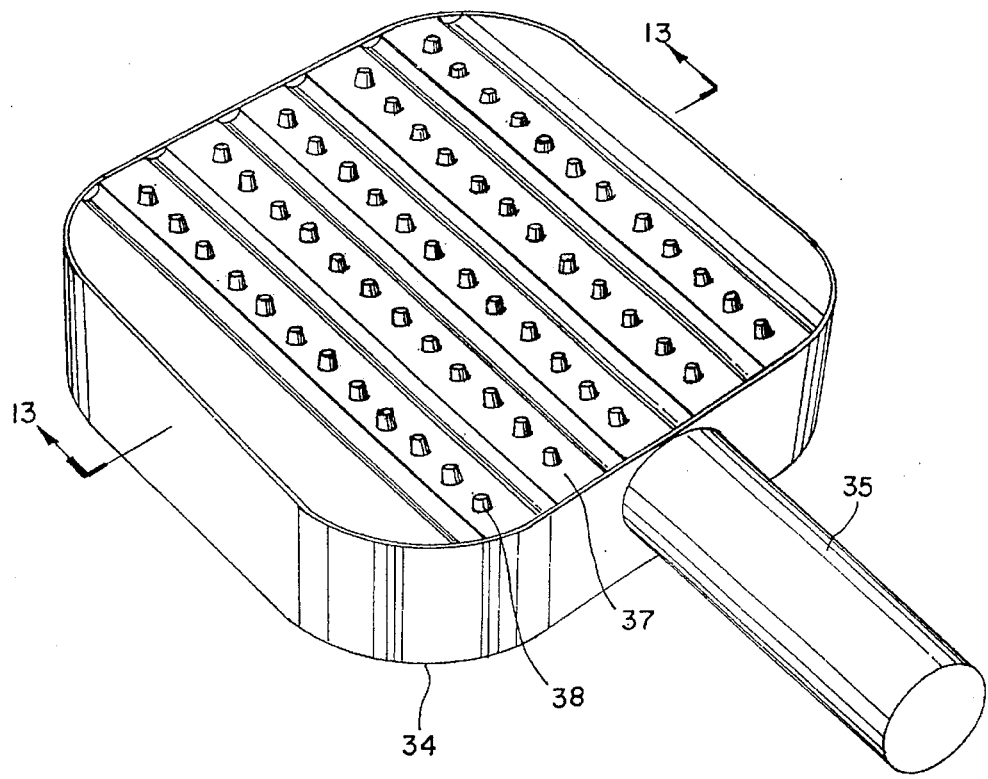
FIG. 12 shows a perspective view of a lower part of the alternative embodiment.

The device shown in FIG. 11 illustrates an alternative embodiment of the present invention and, in combination with that portion shown in FIG. 12, is intended to replace the combined grilling structure 22 of the first embodiment.

The structure of FIG. 11 includes a frame 34 of the lower part (The upper frame 39 cannot be seen.) to which is connected a handle 35. Slatted grills 36 of the upper part can also be seen. (The lower part cannot be seen.)

Figure 13:
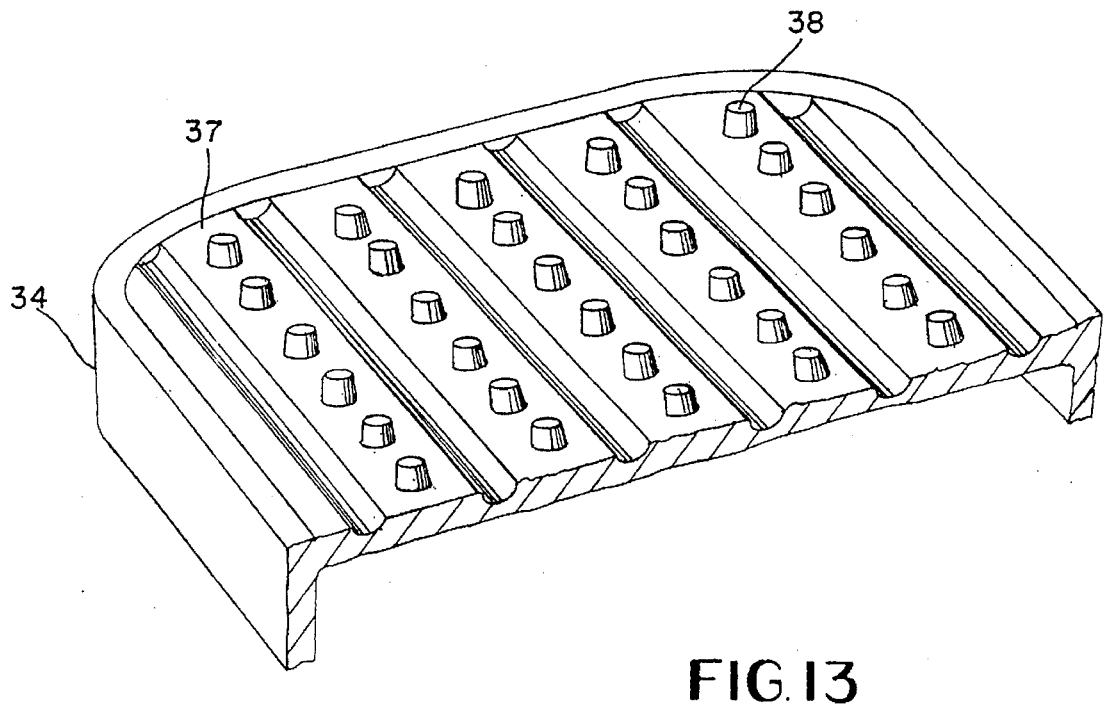
FIG. 13 shows a cross-sectional view taken along line 13—13 of FIG. 12.

As shown in further detail, the lower part shown in FIGS. 12 and 13 includes a frame 34 provided with a handle 35.

Inside of the frame 34 is located a plate 37 in which are placed jets 38. The jets 38 are the same distance from each other as openings 32 in the cooking range.

Figure 14:
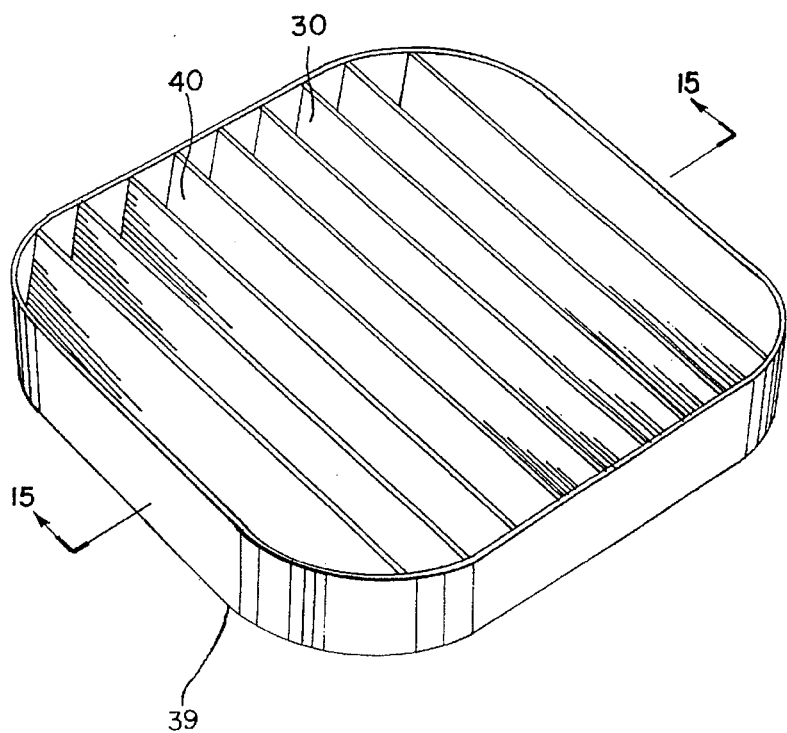
FIG. 14 shows a perspective view of an upper part of the alternative embodiment.
Figure 15:
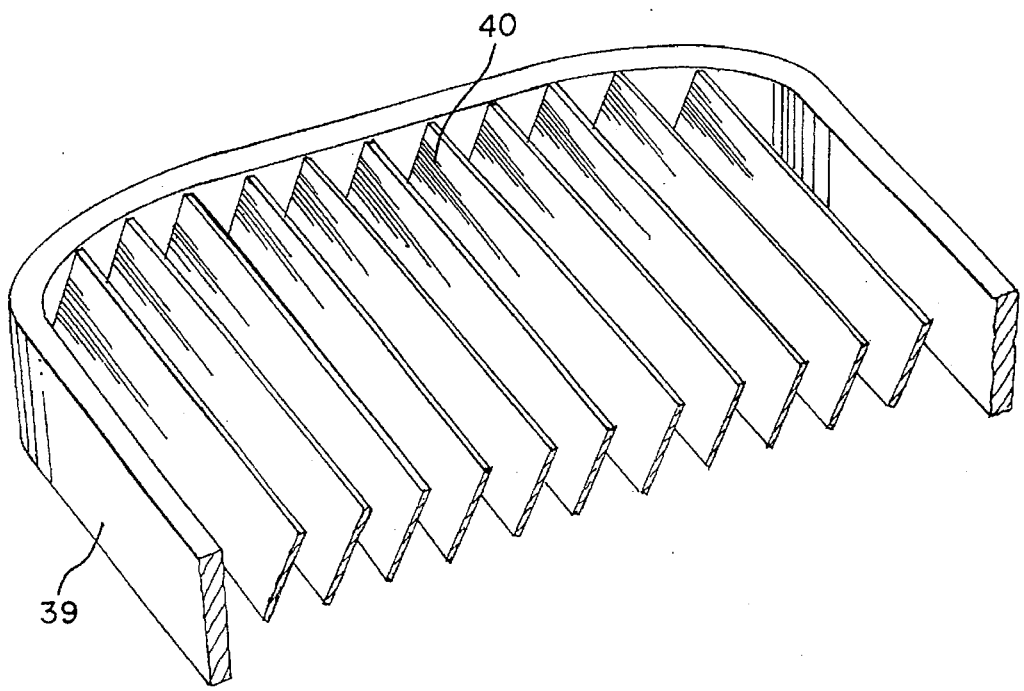
FIG. 15. shows a cross-sectional view taken along line 15—15 of FIG. 14.

The upper part shown in FIGS. 14 and 15 includes a frame member 39 and slotted grills 40. Frames 34 and 39 may be the same or different.

The device according to the present invention is suitably made of a metallic material, such as stainless steel, etc.

When the device is to be used, the gas of the cooking range is ignited, the food to be grilled is put on the slatted grills and the fat and/or liquid drips down to the plate on the lower part and is collected in the space between the gas jets. When the grilling operation is terminated, the fire is put out. When the device is to be cleaned, the fat and/or liquid can be easily removed from the plate by removing the device from the cooking range.

The frames are located either one upon another or the upper one in the lower one.

The strength of the fire is controlled by the knob(s) controlling the gas flow from the cooking range towards the lower part of the device according to the present invention. When the cooking range has more than one cooking source only, one of them is chosen.

The gas may be ignited electrically or by a match.

The invention being thus described, it should be understood that the same may be varied in many ways. Such variations are not to be regarded as a departure from the spirit and scope of the invention, and all such modifications as would be obvious to one skilled in the art are intended to be included within the scope of the following claims.

What is claimed is:

1. A grilling device comprising:

a gas supply source;

a bottom frame including a plurality of openings formed therein, each of said plurality of openings being spaced apart from each other;

connecting means connecting said gas supply source to said bottom frame thereby distributing a gas supply to the plurality of openings;

a middle frame mounted on said bottom frame, said middle frame including a plate;

a plurality of gas jets formed in rows on said middle frame through which the gas emanating from said plurality of openings may flow and be ignited, said plurality of jets being located within said plate positioned over said openings;

an upper frame mounted on said middle frame;

a plurality of slatted grills formed on said upper frame, said slatted grills being spaced apart from each other by a distance corresponding to a distance between the rows of gas jets; and a cover mounted on said upper frame of said grilling device, a chimney formed in said cover, and a filter formed in the chimney, wherein each of said frames is superposed one upon another to form said grilling device.

2. The grilling device according to claim 1, wherein each of said frames are superposed one upon another in one subframe.

3. The grilling device according to claim 1, wherein each of said frames has the same peripheral size.

4. The grilling device according to claim 1, further comprising a fan positioned within the chimney.

5. The grilling device according to claim 1, wherein the gas supply source is a surface of a cooking range.

6. The grilling device according to claim 1, wherein the gas supply source is a gas tank.

* * * * *